(12) United States Patent
Maida, Jr.

(10) Patent No.: US 6,907,170 B1
(45) Date of Patent: Jun. 14, 2005

(54) HYDROGEN DIFFUSION DELAY BARRIER FOR FIBER OPTIC CABLES USED IN HOSTILE ENVIRONMENTS

(75) Inventor: John L. Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/896,387

(22) Filed: Jul. 22, 2004

(51) Int. Cl.$^7$ ................................................ G02B 6/44
(52) U.S. Cl. .................. 385/100; 385/102; 385/123; 385/127; 385/128; 385/141
(58) Field of Search ............................... 385/100, 101, 385/102, 104, 123, 127, 128, 141

(56) References Cited

U.S. PATENT DOCUMENTS

| | | | | |
|---|---|---|---|---|
| 4,696,543 A | * | 9/1987 | Pitt et al. | 385/102 |
| 5,140,664 A | * | 8/1992 | Bosisio et al. | 385/109 |
| 5,857,255 A | | 1/1999 | Wichmann | 29/458 |
| 5,896,482 A | * | 4/1999 | Blee et al. | 385/107 |
| 6,130,981 A | | 10/2000 | Nelson et al. | 385/128 |
| 6,220,059 B1 | | 4/2001 | Klein et al. | 65/394 |
| 6,258,404 B1 | | 7/2001 | Morgand et al. | 427/163.2 |
| 6,343,173 B2 | | 1/2002 | Hordvik et al. | 385/102 |
| 6,404,961 B1 | | 6/2002 | Bonja et al. | 385/109 |
| 6,438,999 B1 | | 8/2002 | Antos et al. | 65/399 |
| 6,475,620 B1 | | 11/2002 | Ruello et al. | 428/392 |
| 6,496,625 B1 | | 12/2002 | Falkowich et al. | 385/100 |
| 6,557,630 B2 | | 5/2003 | Harkins et al. | 166/250.01 |
| 6,597,850 B2 | | 7/2003 | Andrieu et al. | 385/128 |
| 6,614,970 B2 | | 9/2003 | Bonicel | 385/109 |
| 6,685,361 B1 | | 2/2004 | Rubino et al. | 385/58 |
| 6,690,866 B2 | | 2/2004 | Bonja et al. | 385/109 |
| 6,751,556 B2 | | 6/2004 | Schroeder et al. | 702/6 |
| 2004/0258371 A1 | * | 12/2004 | Kuczma et al. | 385/100 |

FOREIGN PATENT DOCUMENTS

GB    2402231 A    12/2004    ............ G02B/6/44

OTHER PUBLICATIONS

Advertisement, "Downhole Optical Cable," Weatherford International Ltd., 2 pages, ©2003, no publication date.

* cited by examiner

Primary Examiner—Brian M. Healy
(74) Attorney, Agent, or Firm—Kevin J. Meek; Brian J. Gaffney

(57) ABSTRACT

A fiber optic cable for use in a hostile environment includes a fiber in metal core. The fiber in metal core includes one or more optical fibers that are disposed inwardly from an inner axial tube. The fiber optic cable also includes a hydrogen barrier shell that is disposed outwardly from the inner axial tube. The hydrogen barrier shell includes a material that is capable of reducing hydrogen permeation through the fiber optic cable. In this particular embodiment, the hydrogen barrier layer also includes a thickness of at least one-thousandth of an inch.

59 Claims, 2 Drawing Sheets

HYDROGEN DIFFUSION DELAY BARRIER FOR FIBER OPTIC CABLES USED IN HOSTILE ENVIRONMENTS

TECHNICAL FIELD OF THE INVENTION

This invention relates in general to fiber optic cables, and more particularly, to a system and method for reducing the effects of hydrogen diffusion in fiber optic cables used in hostile environments.

Overview

Fiber optic cables used in hostile environments, such as those found "under-sea" in telecommunications systems and/or "down-hole" in oil and gas wells, provide a critical link between sensors within the hostile environment and instrumentation outside the environment. In some oil and gas applications, the environment in a down-hole well can include relatively high temperatures, high vibration, corrosive chemistries, and/or the presence of hydrogen. Using conventional fiber optic cables in down-hole environments having the presence of hydrogen and relatively high temperatures often results in degradation of the fiber optic cable. In most cases, degradation of the fiber optic cable can reduce the normal life expectancy of the optical fibers within the cable. Moreover, degradation of the fiber optic cable typically reduces the optical performance of the optical fibers.

SUMMARY OF EXAMPLE EMBODIMENTS

In one embodiment, a fiber optic cable for use in a hostile environment comprises a fiber in metal core. The fiber in metal core comprises one or more optical fibers that are disposed inwardly from an inner axial tube. The fiber optic cable further comprises a hydrogen barrier shell that is disposed outwardly from the inner axial tube. The hydrogen barrier shell comprises a material that is capable of reducing hydrogen permeation through the fiber optic cable. In this particular embodiment, the hydrogen barrier layer also comprises a thickness of at least one-thousandth of an inch.

In another embodiment, a fiber optic cable for use in a hostile environment comprises a fiber in metal core. The fiber in metal core comprises one or more optical fibers that are disposed inwardly from an inner axial tube. The fiber optic cable further comprises a hydrogen barrier shell that includes a material capable of reducing hydrogen permeation through a fiber optic cable. The hydrogen barrier is operable to substantially encapsulate the inner axial tube. In one particular embodiment, at least a portion of an inner surface of the hydrogen barrier shell is in contact with and adheres to at least a portion of an outer surface of the inner axial tube through an interference fit.

In yet another embodiment, a fiber optic cable for use in a hostile environment comprises a fiber in metal core. The fiber in metal core comprises one or more optical fibers that are disposed inwardly from an inner axial tube. The fiber optic cable further comprises a hydrogen barrier shell that is disposed outwardly from the inner axial tube and is operable to substantially encapsulate the inner axial tube. The hydrogen barrier shell comprises a material that is capable of reducing hydrogen permeation through the fiber optic cable. In one particular embodiment, the hydrogen barrier shell is substantially free from relying on the inner axial tube for mechanical integrity.

According to a system embodiment, a control system for use in a hostile environment comprises a control module capable of monitoring one or more parameters associated with the hostile environment. The system further comprises a fiber optic cable. The fiber optic cable comprises a fiber in metal core that includes one or more optical fibers that are disposed inwardly from an inner axial tube. The fiber optic cable further comprises a hydrogen barrier shell that is disposed outwardly from the inner axial tube and is operable to substantially encapsulate the inner axial tube. The hydrogen barrier shell comprises a material capable of reducing hydrogen permeation through a fiber optic cable and a thickness of at least one-thousandth of an inch.

According to one exemplary method of forming the present invention, a method of forming a fiber optic cable capable of being used in a hostile environment comprises forming a fiber in metal core. The fiber in metal core comprises one or more optical fibers disposed inwardly from an inner axial tube. The method further comprises forming a hydrogen barrier shell that is disposed outwardly from the inner axial tube. In one particular embodiment, forming the hydrogen barrier comprises forming a conductive layer that is disposed outwardly from the inner axial tube. The conductive layer comprises a wickable conductor. After forming the conductive layer, the conductive layer is passed through a molten bath comprising a material capable of reducing hydrogen permeation through a fiber optic cable. In one particular embodiment, the wickable conductor operates to convey the material of the molten bath into voids of the conductive layer by capillary, adhesive, or wicking action.

Depending on the specific features implemented, particular embodiments of the present invention may exhibit some, none, or all of the following technical advantages. Various embodiments may be capable of reducing and/or slowing the deleterious effects of hydrogen on fiber optic cables. Some embodiments may be capable of generating a relatively robust hydrogen barrier within the fiber optic cable.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

FIGS. 1A through 1D are cross-sectional views showing one example of a method of forming one embodiment of a fiber optic cable 100 for use in a hostile environment. Particular examples and dimensions specified throughout this document are intended for exemplary purposes only, and are not intended to limit the scope of the present disclosure. Moreover, the illustrations in FIGS. 1A through 1D are not intended to be to scale.

In various embodiments, one or more optical fibers within fiber optic cable 100 can be used as a distributed sensor within the hostile environment. That is, one or more optical fibers within optical cable 100 may be capable of, for example, sensing a temperature profile, a strain profile, or a combination of these or other parameters. In other embodiments, fiber optic cable 100 can be used to communicate data from sensors within a hostile environment to instrumentation outside the environment. In one particular embodiment, fiber optic cable 100 communicates data from sensors within a down-hole oil or gas well to instrumentation outside the down-hole well. In that embodiment, the down-hole oil or gas well environment typically includes the presence of hydrogen, relatively high temperatures, and/or corrosive chemistries. In most cases, the relatively high temperature of the down-hole environment can be, for example, at least 30° C., at least 100° C., at least 150° C., or more. In other embodiments, fiber optic cable 100 is capable of being used in a sub-sea environment that includes the presence of hydrogen.

One aspect of this disclosure recognizes that forming a hydrogen barrier shell within fiber optic cable 100 can alleviate some of the problems conventionally associated with the use of fiber optical cable 100 in hostile environments. In particular, forming a hydrogen barrier within fiber optic cable 100 can minimize and/or delay the deleterious effects of hydrogen on the optical fibers used in hostile environments, such as those found in the down-hole oil or gas well industry and/or the under-sea telecommunications industry.

Figure 1A:
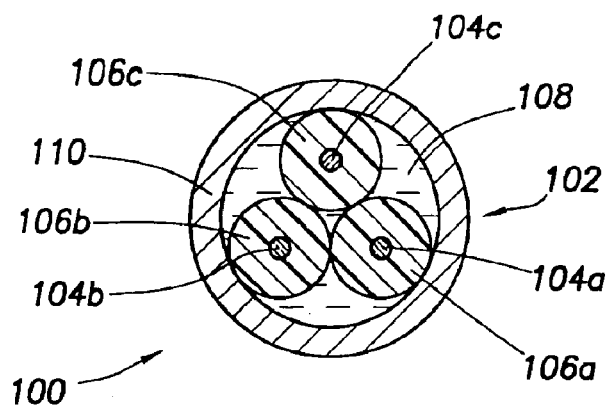
FIGS. 1A through 1D are cross-sectional views showing one example of a method of forming one embodiment of a fiber optic cable for use in a hostile environment.

FIG. 1A shows a cross-sectional view of a fiber optic cable 100 after formation of a fiber in metal tube core 102. Forming core 102 may be effected through any of a variety of standard fiber optic cable manufacturing techniques. In this example, core 102 includes three optical fibers 104a–104c disposed inwardly from an inner axial tube 110. Although this example includes three optical fibers 104, any number of optical fibers 104 may be used without departing from the scope of the present disclosure. Optical fibers 104a–104c can comprise, for example, a single mode optical fiber, a multi-mode optical fiber, or a combination of these or other fiber types. In one particular example, optical fibers 104a and 104b comprise 50/125 μm Graded Index Multi-Mode fibers manufactured by SUMITOMO and optical fiber 104c comprises 10/125 μm Pure Core Step Index Single-Mode fiber manufactured by SUMITOMO.

Inner axial tube 110 can comprise, for example, Stainless Steel, Inconel, Incoloy, or any other corrosion resistant metal alloy. In this particular example, inner axial tube 110 comprise a Stainless Steel micro-tube having approximately $\frac{1}{16}$-inch outer diameter and a 0.005-inch wall thickness. Although this example includes an outer diameter of $\frac{1}{16}$-inch and a wall thickness of 0.005-inches, any other selected outer diameter and wall thickness may be used without departing from the scope of the present disclosure. The selected diameter and wall thickness of inner axial tube 110 may vary depending upon the materials used and the number of optical fibers 104. Moreover, the selected diameter and wall thickness of inner axial tube 110 may vary throughout the length of fiber optic cable 100.

Fiber in metal tube core 102 also includes three optical fiber buffers 106a–106c disposed inwardly from inner axial tube 110 and outwardly from optical fibers 104a–104c. In this particular example, optical fiber buffers 106 comprise 400 μm of silicon and 700 μm of Teflon FEP. Although silicon and Teflon are used in this example, any other optical fiber buffer materials may be used without departing from the scope of the present disclosure.

Fiber in metal tube core 102 further includes a filler material 108 disposed inwardly from inner axial tube 110 and capable of substantially filling any void spaces within inner axial tube 110. In some cases, filler material 108 can operate to support optical fibers 104 and/or minimize vibration. Filler material 108 can comprise, for example, thixotropic gel, a hydrophobic gel, a hydrogen scavenging gel, or any other suitable filler material. In one particular embodiment, filler material 108 comprises Sepigel H200 LWT having a hydrogen scavenger. Using a filler material 108 having a hydrogen scavenger allows fiber optic cable 100 to alleviate hydrogen degradation of optical fibers 104 for hydrogen generated within core 102. Moreover, implementing a hydrogen scavenging or hydrogen absorptive material within filler material 108 can assist in creating a hydrogen barrier for hydrogen generated by a hostile environment.

Figure 1B:
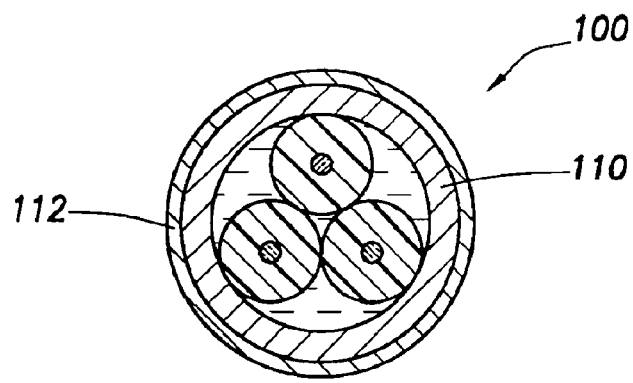

FIG. 1B shows a cross-sectional view of a fiber optic cable 100 after formation of a conductive layer 112 outwardly from fiber in metal core 102. Forming conductive layer 112 may be effected through any of a variety of standard techniques associated with cable manufacturing. In various embodiments, conductive layer 112 may be capable of conveying electrical signals from instrumentation located outside a hostile environment to sensors and/or equipment within the hostile environment. In other embodiments, conductive layer 112 may be capable of conveying electrical signals from sensors and/or equipment within the hostile environment to instrumentation outside the hostile environment. In some cases, the electrical signal conveyed may comprise, for example, a control signal, a voltage, a current, or a combination of these or other electrical signals.

Conductive layer 112 can comprise any conductive material, such as, for example, copper, gold, silver, or a combination of these or other metallic or non-metallic materials. In some embodiments, conductive layer can comprise, for example, a braided, straight, or helically laid conductor. In this particular embodiment, conductive layer 112 comprises a wickable conductor such as, for example, a braided conductor, a helically laid conductor, or any other wickable conductive layer. As used throughout this document, the phrase "wickable conductor" refers to a conductor that is capable of conveying molten material by capillary, adhesive, or wicking action. In this particular example, conductive layer 112 comprises a pre-tinned copper braid.

In this particular embodiment, conductive layer 112 resides outwardly from and in contact with inner axial tube 110. That is, at least a portion of an inner surface of conductive layer 112 contacts at least a portion of an outer surface of inner axial tube 110. In some cases, forming conductive layer 112 in contact with inner axial tube 110 can improve the conductivity of fiber optic cable 100 by reducing the linear resistance associated with cable 100. Conductive layer 112 can comprise any selected thickness that achieves a desired conductivity for fiber optic cable 100. For example, conductive layer 112 can comprise a thickness of at least three-thousandths of an inch, at least seven-thousandths of an inch, at least twelve-thousandths of an inch, or any other thickness that achieves the selected conductivity.

In this example, the portion of conductive layer 112 in contact with inner axial tube 110 adheres to inner axial tube 110 through an interference fit. As used throughout this document, the phrase "interference fit" refers to adhesion between mating surfaces that results from tensile and/or compressive forces associated with at least one of the two surfaces. Moreover, an interference fit is one that is substantially free from chemical or mechanical bonding processes. That is, the points at which conductive layer 112 adhere to inner axial tube 110 are substantially free from ionic bonding, covalent bonding, epoxy bonding, brazing and/or welding.

Although this example shows inner axial tube 110 and conductive layer 112 as being formed without interstitial layers between them, such interstitial layers could alternatively be formed without departing from the scope of the present disclosure. In an alternative embodiment, an insulating layer can be formed between inner axial tube 110 and conductive layer 112. In that embodiment, the insulating layer may comprise, for example, a Polyimide, material, a TEFLON PFA material, or a combination of these or other insulating materials.

Figure 1C:
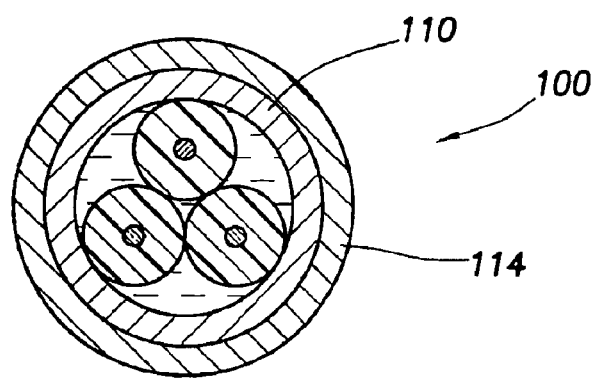

FIG. 1C shows a cross-sectional view of a fiber optic cable 100 after formation of a hydrogen barrier shell 114 outwardly from inner axial tube 110. As used throughout this document, the term "shell" refers to an outer cover that creates a cylindrical encapsulation substantially around a material disposed inwardly therefrom. In other words, hydrogen barrier shell 114 forms a cylindrical encapsulation substantially around inner axial tube 110 of fiber in metal core 102 that is capable of reducing hydrogen permeation through cable. Moreover, the term "shell" refers to an outer cover that substantially provides its own mechanical integrity and is not required to function as a pressure boundary. In contrast, a coating typically relies on an ionic or covalent bond with a substrate to provide its mechanical integrity.

In various embodiments, hydrogen barrier shell 114 may be capable of conveying electrical signals from instrumentation located outside a hostile environment to sensors and/or equipment within the hostile environment. In other embodiments, hydrogen barrier shell 114 may be capable of conveying electrical signals from sensors and/or equipment within the hostile environment to instrumentation outside the hostile environment. In some cases, the electrical signal conveyed may comprise, for example, a control signal, a voltage, a current, or a combination of these or other electrical signals.

Hydrogen barrier shell 114 can comprise any material or combination of materials capable of reducing hydrogen permeation through fiber optic cable 100. For example, hydrogen barrier shell 114 can comprise carbon, silicon, germanium, tin, lead, gold, or a combination of these or other materials. In this example, hydrogen barrier shell 114 comprises a thickness capable of withstanding scratches and other surface blemishes without significantly affecting the ability of hydrogen barrier shell 114 to reduce and/or delay hydrogen permeation through cable 100. In some cases, hydrogen barrier shell 114 can comprise a thickness of, for example, at least one-thousandth of an inch, at least five-thousandths of an inch, at least twelve-thousandths of an inch, at least twenty thousandths of an inch, or any other selected thickness. In some embodiments, hydrogen barrier shell 114 may be capable of reducing and/or delaying radiation permeation through fiber optic cable 100.

Forming hydrogen barrier shell 114 may be effected through any of a variety of manufacturing processes. In one particular embodiment, hydrogen barrier shell 114 is formed by passing conductive layer 112 through a molten bath comprising a material or combination of materials capable of reducing and/or delaying hydrogen permeation through fiber optic cable 100. The material of the molten bath can comprise, for example, carbon, silicon, germanium, tin, lead, gold, or a combination of these or other elements. In this particular embodiment, the material of the molten bath comprises tin. In that embodiment, conductive layer 112 operates to convey the tin material of the molten bath into conductive layer 112 by a wicking action to form hydrogen barrier shell 114. In this particular embodiment, the temperature of the tin material of the molten bath comprises approximately 240° C. Although the temperature of the molten bath material is 240° C. in this example, any other temperature can be used without departing from the scope of the present disclosure.

Cable manufacturers can adjust various process parameters to achieve a desired thickness and/or hydrogen permeation rate for hydrogen barrier shell 114. For example, cable manufacturers can adjust the temperature of the material of the molten bath and the length of the molten bath to achieve the desired results. In various embodiments, the temperature of the material of the molten bath can be manipulated by combining the desired material with eutectics of that material. For example, if the material of the molten bath comprises lead, then a cable manufacturer could add tin to the molten bath to manipulate the melting point of lead.

In addition, cable manufacturers can adjust the rate at which conductive layer 112 passes through the molten bath. In most cases, the rate at which conductive layer 112 passes through the molten bath is based at least in part on the temperature associated with the material of the molten bath. That is, the higher the temperature of the material of the molten bath, the higher the rate at which conductive layer 112 passes through the molten bath.

In various embodiments, conductive layer 112 passes through the molten bath at a rate sufficient to minimize the effect of high temperatures associated with the molten bath material on the materials within fiber in metal core 102. In other words, each portion of conductive layer 112 remains in the molten bath for a period of time that minimizes the effects of the high temperature on materials within core 102 and, in particular, on filler material 108. In some cases, each portion of conductive layer 112 remains in the molten bath for, for example, no more than one-hundred milli-seconds, no more than ½-second, or no more than one-second. The period of time that each portion of conductive layer 112 can remain in the molten bath depends at least in part on the temperature of the molten material and the temperature ratings of the materials within fiber in metal core 102.

In some embodiments, the manufacturing process associated with forming hydrogen barrier shell 114 can implement a 2:1 ratio between a desired rate of travel and the length of the molten bath. That is, if the desired rate of travel through the molten bath is ten-feet per second and, to achieve the desired thickness of hydrogen barrier shell 114, each portion of conductive layer 112 remains in the molten bath for ½-second, then the length of the molten bath is selected to be five-feet. In most cases, the 2:1 ratio can achieve the desired thickness of hydrogen barrier shell 114 and can minimize the effects of the high temperature on the materials of fiber in metal core 102. Although this example implements a 2:1 ratio, any other selected ratio can be used without departing from the scope of the present disclosure.

In an alternative embodiment, before passing conductive layer 112 through the molten bath to form hydrogen barrier shell 114, conductive layer 112 can pass through an oxide cleaner to remove any oxides associated with conductive layer 112. In various embodiments, the oxide cleaner may comprise, for example, an acid flux cleaner, a terpene flux cleaner, an environmentally safe flux cleaner, or any other suitable flux cleaner.

Figure 1D:
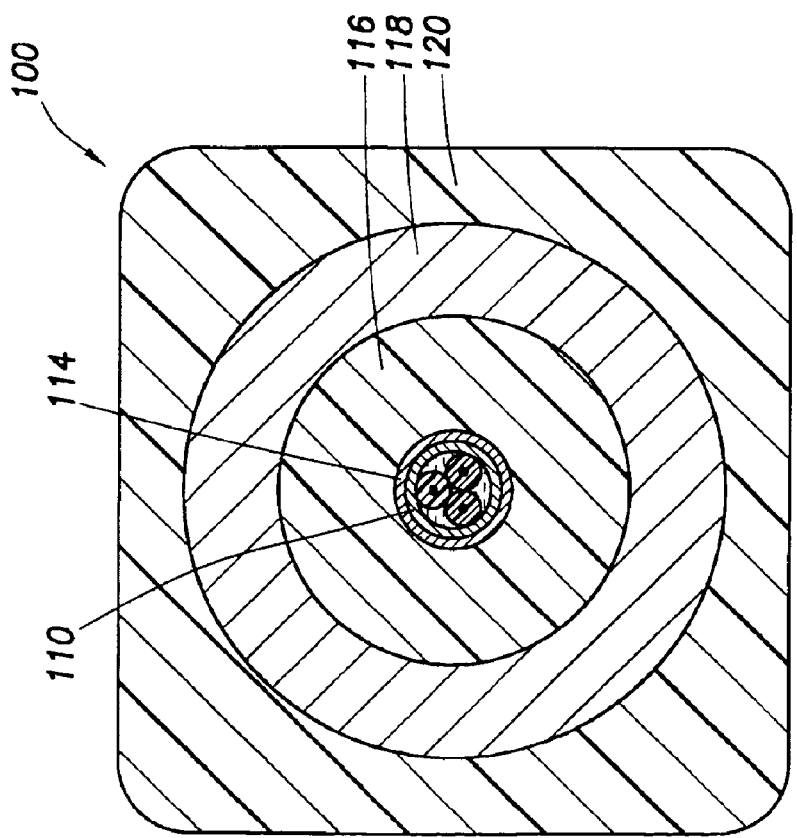

FIG. 1D shows a cross-sectional view of a fiber optic cable 100 after formation of a buffer layer 116 outwardly from hydrogen barrier shell 114, an outer axial tube 118 outwardly from buffer layer 116, and an encapsulation layer 120 outwardly from outer axial tube 118. Forming buffer layer 116, outer axial tube 118, and encapsulation layer 120 may be effected through any of a variety of standard cable manufacturing techniques. Although this example shows buffer layer 116, outer axial tube 118, and encapsulation layer 120 as being formed without interstitial layers, such interstitial layers could alternatively be formed without departing from the scope of the present disclosure.

Buffer layer 116 can comprise, for example, Polypropylene, Fluoroethylenepropylene (FEP), Ethylene-chlorotrifluoroethylene (ECTFE), Polyvinylidene fluoride (PVDF), perfluor alkoxy (PFA), TEFLON, TEFLON PFA, TETZEL, or any other suitable material. In various embodiments, buffer layer 116 may be capable of maintaining inner axial tube 110 approximately centered within outer axial tube 118. In other embodiments, buffer layer 116 may be capable of protecting hydrogen barrier shell 114 and/or core 102 from damage that may result from vibration.

Outer axial tube 118 can comprise, for example, Stainless Steel, Inconel, Incoloy, or any other corrosion resistant metal alloy. In this particular example, outer axial tube 118 comprises an Inconel A825 tube having a ½-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of outer axial tube 118 may vary over the length of fiber optic cable 100 depending upon the material selected.

In some cases, the formation of outer axial tube 118 results in outer axial tube 118 compressing buffer layer 116 against hydrogen barrier shell 114. In those cases, the compression of buffer layer 116 can operate to minimize any relative movement between outer axial tube 118 and hydrogen barrier shell 114.

In this particular embodiment, encapsulation layer 120 operates to protect the materials of fiber optic cable 100 during handling and installation. Encapsulation layer 120 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, or any other suitable material. In this particular embodiment, encapsulation layer 120 comprises an 11 mm by 11 mm Santoprene layer. Although this example includes an 11 mm by 11 mm encapsulation layer, any other combination of size and temperature rating can be used without departing from the scope of the present disclosure.

Figure 2:
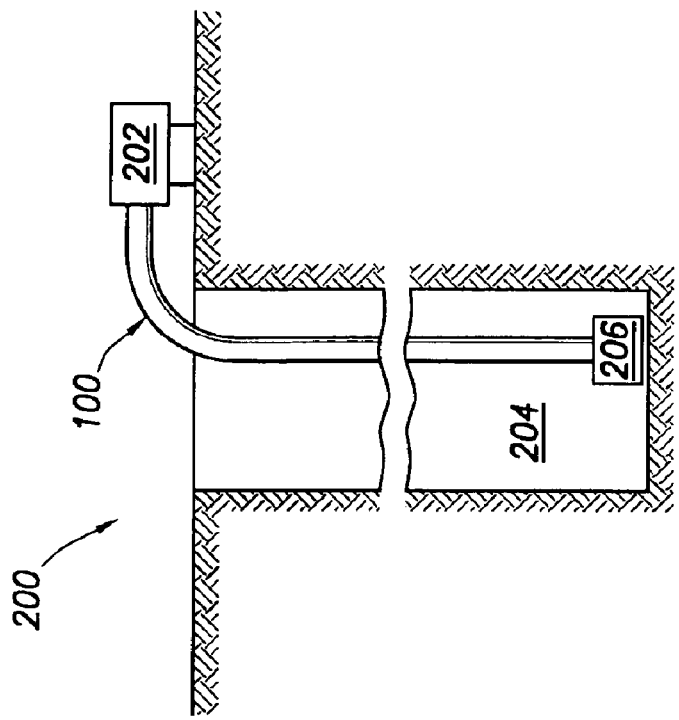
FIG. 2 is a block diagram illustrating a control system implementing fiber optic cable in a down-hole environment.

In various embodiments, fiber optic cable 100 is capable of providing reliable transmission of optical signals between one or more sensors within a hostile environment and instrumentation outside the hostile environment. In other embodiments, fiber optic cable 100 is capable of conveying electrical signals between instrumentation outside the environment and sensors and/or equipment within the environment. FIG. 2 illustrates one particular implementation of fiber optic cable 100.

FIG. 2 is a block diagram illustrating a control system 200 implementing fiber optic cable 100 in a down-hole environment 204. In this example, control system 200 includes a controller 202 that is capable of monitoring one or more parameters associated with down-hole environment 204. In other embodiments, controller 202 may be capable of conveying electrical signals to equipment and/or sensors located within down-hole environment 204. Controller 202 can comprise, for example, any combination of hardware, software, and/or firmware that is capable of performing a desired functionality.

In various embodiments, each optical fiber 104a–104c of fiber optic cable 100 may transmit optical signals between sensors 206 and controller 202. In other embodiments, one or more of optical fibers 104a–104c can comprise a distributed sensor that is capable of monitoring, for example, a temperature profile of down-hole environment 204, a strain, or a combination of these or other parameters. In this particular embodiment, down-hole environment 204 includes the presence of hydrogen and a relatively high temperature. In some cases, the relatively high temperatures in the down-hole well can exceed approximately 100° C.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A fiber optic cable for use in a hostile environment, comprising:
   a fiber in metal core comprising one or more optical fibers disposed inwardly from an inner axial tube; and
   a hydrogen barrier shell disposed outwardly from the inner axial tube, the hydrogen barrier shell comprising a material capable of reducing hydrogen permeation through a fiber optic cable and a thickness of at least one-thousandth of an inch.

2. The fiber optic cable of claim 1, wherein the one or more optical fibers operate as a distributed sensor capable of monitoring the one or more parameters associated with the hostile environment.

3. The fiber optic cable of claim 1, wherein the inner axial tube comprises a material selected from the group consisting of Stainless Steel, Inconel, and Incoloy.

4. The fiber optic cable of claim 1, wherein the fiber in metal core further comprises a filler material disposed inwardly from the inner axial tube and outwardly from the one or more optical fibers.

5. The fiber optic cable of claim 4, wherein the filler material comprises a hydrogen absorptive material.

6. The fiber optic cable of claim 1, wherein the hydrogen barrier shell adheres to the inner axial tube through an interference fit.

7. The fiber optic cable of claim 1, wherein the hydrogen barrier shell comprises a conductive layer that has been passed through a molten bath.

8. The fiber optic cable of claim 7, wherein the conductive layer is selected from the group consisting of copper, gold, and silver.

9. The fiber optic cable of claim 7, wherein the conductive layer comprises a wickable conductor.

10. The fiber optic cable of claim 7, wherein the conductive layer is selected from the group consisting of a braided conductor, a straight conductor, and a helically laid conductor.

11. The fiber optic cable of claim 1, wherein the hydrogen barrier shell comprises a pre-tined copper braided conductor that has been passed through a molten tin bath.

12. The fiber optic cable of claim 1, wherein the hydrogen barrier shell is capable of conveying an electrical signal.

13. The fiber optic cable of claim 1, wherein the material capable of reducing hydrogen permeation through the fiber optic cable is selected from the group consisting of carbon, silicon, germanium, tin, lead, and gold.

14. The fiber optic cable of claim 1, wherein the thickness of the hydrogen barrier shell comprises at least five-thousandths of an inch.

15. The fiber optic cable of claim 1, wherein the thickness of the hydrogen barrier shell comprises a thickness of at least twelve-thousandths of an inch.

16. The fiber optic cable of claim 1, wherein the hydrogen barrier shell substantially encapsulates the inner axial tube.

17. The fiber optic cable of claim 1, wherein the hydrogen barrier shell is substantially free from relying on the inner axial tube for mechanical integrity.

18. The fiber optic cable of claim 1, further comprising an insulation layer disposed outwardly from the fiber in metal core and inwardly from the hydrogen barrier shell.

19. A method of forming a fiber optic cable capable of being used in a hostile environment, the method comprising:
   forming a fiber in metal core comprising one or more optical fibers disposed inwardly from an inner axial tube;
   forming a hydrogen barrier shell disposed outwardly from the inner axial tube, wherein forming the hydrogen barrier comprises:
      forming a conductive layer disposed outwardly from the inner axial tube, the conductive layer comprising a wickable conductor; and
      after forming the conductive layer, passing the conductive layer through a molten bath comprising a material capable of reducing hydrogen permeation through a fiber optic cable, wherein the wickable conductor operates to convey the material of the molten bath into voids of the conductive layer by a wicking action.

20. The method of claim 19, wherein the hydrogen barrier shell substantially encapsulates the inner axial tube.

21. The method of claim 19, wherein the hydrogen barrier shell is substantially free from relying on the inner axial tube for mechanical integrity.

22. The method of claim 19, further comprising an insulation layer disposed outwardly from the fiber in metal core and inwardly from the hydrogen barrier shell.

23. The method of claim 19, wherein the hydrogen barrier shell comprises a thickness at least one-thousandth of an inch.

24. The method of claim 19, wherein the conductive layer is selected from the group consisting of copper, gold, and silver.

25. The method of claim 19, wherein the conductive layer adheres to the inner axial tube through an interference fit.

26. The method of claim 19, wherein the material capable of reducing hydrogen permeation through the fiber optic cable is selected from the group consisting of carbon, silicon, germanium, tin, lead, and gold.

27. The method of claim 19, wherein the conductive layer comprises a pre-tinned copper braid and the material capable of reducing hydrogen permeation through the fiber optic cable comprises tin.

28. The method of claim 19, wherein the conductive layer is passed through the molten bath at a rate sufficient to minimize temperature effects on the fiber optic cable.

29. The method of claim 19, further comprising, combining the material capable of reducing hydrogen permeation through the fiber optic cable with one or more eutectics of the material.

30. The method of claim 19, further comprising passing the conductive layer through a cleaner to remove oxides.

31. The method of claim 19, further comprising forming an insulation layer outwardly from the inner axial tube and inwardly from the hydrogen barrier shell.

32. A fiber optic cable for use in a hostile environment, comprising:
   a fiber in metal core comprising one or more optical fibers disposed inwardly from an inner axial tube; and
   a hydrogen barrier shell comprising a material capable of reducing hydrogen permeation through a fiber optic cable and operable to substantially encapsulate the inner axial tube, wherein at least a portion of an inner surface of the hydrogen barrier shell is in contact with and adheres to at least a portion of an outer surface of the inner axial tube through an interference fit.

33. The fiber optic cable of claim 32, wherein the fiber in metal core further comprises a filler material having a hydrogen absorptive material.

34. The fiber optic cable of claim 32, wherein the hydrogen barrier shell comprises a conductive layer that has been passed through a molten bath and wherein the conductive layer comprises a wickable conductor.

35. The fiber optic cable of claim 34, wherein the conductive layer is selected from the group consisting of copper, gold, and silver.

36. The fiber optic cable of claim 34, wherein the conductive layer is selected from the group consisting of a braided conductor, a straight conductor, and a helically laid conductor.

37. The fiber optic cable of claim 32, wherein the hydrogen barrier shell comprises a pre-tined copper braided conductor that has been passed through a molten tin bath.

38. The fiber optic cable of claim 32, wherein the material capable of reducing hydrogen permeation through the fiber optic cable is selected from the group consisting of carbon, silicon, germanium, tin, lead, and gold.

39. The fiber optic cable of claim 32, wherein the hydrogen barrier shell comprises a thickness at least one-thousandth of an inch.

40. The fiber optic cable of claim 32, wherein the hydrogen barrier shell comprises a thickness at least five-thousandths of an inch.

41. The fiber optic cable of claim 32, wherein the hydrogen barrier shell is capable of conveying an electrical signal.

42. The fiber optic cable of claim 32, wherein the hydrogen barrier shell is substantially free from relying on the inner axial tube for mechanical integrity.

43. A fiber optic cable for use in a hostile environment, comprising:
   a fiber in metal core comprising one or more optical fibers disposed inwardly from an inner axial tube; and
   a hydrogen barrier shell disposed outwardly from the inner axial tube and operable to substantially encapsulate the inner axial tube, the hydrogen barrier shell comprising a material capable of reducing hydrogen permeation through the fiber optic cable, wherein the hydrogen barrier shell is substantially free from relying on the inner axial tube for mechanical integrity.

44. The fiber optic cable of claim 43, wherein the one or more optical fibers operate as a distributed sensor capable of monitoring one or more parameters associated with the hostile environment.

45. The fiber optic cable of claim 43, wherein the hydrogen barrier shell comprises a thickness at least one-thousandth of an inch.

46. The fiber optic cable of claim 43, wherein the hydrogen barrier shell adheres to the inner axial tube through an interference fit.

47. The fiber optic cable of claim 43, wherein the hydrogen barrier shell comprises a conductive layer that has been passed through a molten bath.

48. The fiber optic cable of claim 47, wherein the conductive layer comprises a wickable conductor.

49. The fiber optic cable of claim 43, wherein the hydrogen barrier shell is capable of conveying an electrical signal.

50. A control system for use in a hostile environment, comprising:
- a control module capable of monitoring one or more parameters associated with the hostile environment;
- a fiber optic cable, comprising:
  - a fiber in metal core comprising one or more optical fibers disposed inwardly from an inner axial tube; and
  - a hydrogen barrier shell disposed outwardly from the inner axial tube and operable to substantially encapsulate the inner axial tube, the hydrogen barrier shell comprising a material capable of reducing hydrogen permeation through a fiber optic cable and a thickness of at least one-thousandth of an inch.

51. The system of claim 50, wherein the hostile environment comprises a down-hole environment.

52. The system of claim 50, wherein the control module is further operable to convey electrical signals to equipment located within the hostile environment.

53. The system of claim 50, wherein the one or more optical fibers operate to transmit optical signals between one or more sensors within the hostile environment and the control module.

54. The system of claim 50, wherein the one or more optical fibers operate as a distributed sensor capable of monitoring the one or more parameters associated with the hostile environment.

55. The system of claim 50, wherein the hydrogen barrier shell adheres to the inner axial tube through an interference fit.

56. The system of claim 50, wherein the hydrogen barrier shell comprises a conductive layer that has been passed through a molten bath.

57. The system of claim 56, wherein the conductive layer comprises a wickable conductor.

58. The system of claim 50, wherein the hydrogen barrier shell is substantially free from relying on the inner axial tube for mechanical integrity.

59. The system of claim 50, further comprising a sensor coupled to the fiber optic cable and operable to sense at least one parameter associated with the hostile environment.

* * * * *